United States Patent
Armistead

[11] Patent Number: 5,816,459
[45] Date of Patent: Oct. 6, 1998

[54] PROTECTIVE CARRYING CASE AND METHOD FOR MAKING SAME

[76] Inventor: Thomas M. Armistead, 738 S. Lazona, Mesa, Ariz. 85204

[21] Appl. No.: 968,179

[22] Filed: Nov. 12, 1997

Related U.S. Application Data

[63] Continuation of Ser. No. 568,355, Dec. 6, 1995, abandoned.

[51] Int. Cl.[6] ....................................................... A45F 5/00
[52] U.S. Cl. ........................... 224/246; 224/679; 224/666; 224/930; D3/218
[58] Field of Search ...................................... 224/660, 666, 224/667, 668, 669, 676, 677, 678, 679, 235, 236, 246, 250, 930; D3/218, 230, 243, 263, 265, 266, 267; 206/305, 320, 5, 523, 594, 316.1, 316.2, 316.3

[56] References Cited

U.S. PATENT DOCUMENTS

| | | |
|---|---|---|
| D. 284,372 | 6/1986 | Carpenter . |
| D. 297,188 | 8/1988 | Powell . |
| D. 316,999 | 5/1991 | Sarff . |
| D. 322,719 | 12/1991 | Jayez . |
| D. 329,542 | 9/1992 | Jayez . |
| D. 343,291 | 1/1994 | Langford . |
| D. 343,951 | 2/1994 | Petty et al. ................................ D3/265 |
| D. 346,494 | 5/1994 | Graham et al. . |
| D. 362,542 | 9/1995 | Richards et al. .......................... D3/218 |
| D. 371,137 | 6/1996 | Kriegh ..................................... D3/218 |
| D. 378,020 | 2/1997 | Hatt ......................................... D3/218 |
| 1,547,800 | 7/1925 | Franz . |
| 1,553,066 | 5/1925 | Burger . |
| 2,037,132 | 4/1936 | Hoyt ....................................... 224/193 |
| 2,881,492 | 4/1959 | Aspes . |
| 3,091,378 | 5/1963 | O'Dwyer ................................. 224/668 |
| 3,501,074 | 3/1970 | Emerick ................................... 224/246 |
| 3,631,994 | 1/1972 | Mackzum, Jr. .......................... 224/669 |
| 3,804,306 | 4/1974 | Azurin ..................................... 224/193 |
| 3,910,470 | 10/1975 | Swenson et al. ........................ D3/267 |
| 4,046,295 | 9/1977 | Eichler . |
| 4,057,794 | 11/1977 | Grossfield ............................... 224/666 |
| 4,071,065 | 1/1978 | Halbich . |
| 4,148,422 | 4/1979 | Habler . |
| 4,205,768 | 6/1980 | Hill et al. ................................ 224/193 |
| 4,667,374 | 5/1987 | Bianchi . |
| 4,779,777 | 10/1988 | Johnson et al. ......................... 224/250 |
| 4,828,154 | 5/1989 | Clifton, Jr. . |
| 4,858,798 | 8/1989 | Siddoway et al. . |
| 4,886,197 | 12/1989 | Bowles et al. .......................... 224/192 |
| 4,903,745 | 2/1990 | Roman . |
| 4,984,682 | 1/1991 | Cummins .................................... 206/5 |
| 5,174,482 | 12/1992 | Rogers et al. . |
| 5,174,483 | 12/1992 | Moore, IV et al. . |
| 5,265,720 | 11/1993 | Meliconi . |
| 5,303,860 | 4/1994 | Serafini, Jr. . |
| 5,348,347 | 9/1994 | Shink . |
| 5,351,868 | 10/1994 | Beletsky et al. . |
| 5,411,193 | 5/1995 | Culp . |
| 5,450,993 | 9/1995 | Guerrero et al. ........................ 224/250 |

*Primary Examiner*—Allan N. Shoap
*Assistant Examiner*—Gregory M. Vidovich
*Attorney, Agent, or Firm*—Snell & Wilmer, L.L.P.

[57] ABSTRACT

A protective carrying case for portable electronic equipment and method for making same wherein the case comprises a rigid, impact-resistant outer shell and a resilient, deformable inner shell to provide enhanced protection to the electronic equipment. The case includes a locking spring steel clip for securely attaching the case to the pant or belt of a person. The case is further equipped with an elastic strap which secures the equipment within the case, preventing inadvertent dislodging and possible damage to the equipment.

13 Claims, 10 Drawing Sheets ated States Patent 5,816,459

PROTECTIVE CARRYING CASE AND METHOD FOR MAKING SAME

This is continuation of application Ser. No. 08/568,355, filed Dec. 6, 1995, now abandoned.

BACKGROUND OF THE INVENTION

The present invention relates, generally, to carrying cases and, more particularly to a protective carrying casing for portable electronic equipment.

Portable electronic equipment such as cellular phones and 2-way radios have been used for many years. Cellular phones, 2-way radios, and similar equipment are typically expensive and delicate. When not in use, the equipment is typically placed in a handbag, briefcase, or simply carried in the person's hand. Carrying cases have also been developed.

Presently known carrying cases have a variety of features, and are typically formed of soft-sided materials, such as leather or vinyl, and designed to be carried in the person's hand. Soft sided carrying cases, while light-weight, do not provide impact protection if, for example, the phone is dropped. While some cases are designed to be affixed to the person, e.g. carried on a shoulder strap or affixed to a belt or pant, they fail to provide an adequate mechanism for securing the equipment, such as the cellular phone, within the case. For example, carrying cases may fail to retain the cellular phone in the case if the person bends over or deviates from a generally upright position.

A carrying case is thus needed which overcomes the shortcomings of the prior art.

SUMMARY OF THE INVENTION

Accordingly, the present invention provides methods and apparatus for protecting portable electronic equipment, e.g. a cellular phone, a pager, a digital phone, a 2-way radio, or the like, that overcomes the limitations and deficiencies of presently known devices by providing a hard shell exterior, generally formed to the shape of the equipment, with a strap to secure the equipment within the case, and a rigid clip for secure attachment of the case to a user's belt or pant.

In accordance with a preferred exemplary embodiment, a protective cellular phone case suitably provides an impact-resistant hard shell exterior which generally conforms to the shape of the phone. To provide further impact resistance and protection for the cellular phone, the interior of the hard shell is lined with a resilient, deformable inner shell. An elastic strap secured to the hard shell exterior extends over the cellular phone, securing the phone within the case. In accordance with a further aspect of the present invention, the cellular phone case includes a locking spring steel clip to attach the case to the person's belt or pants waistband.

In accordance with various aspects of the present invention, a protective equipment case is formed by creating a slightly enlarged positive model of the equipment to be housed in the case; forming a tube of resilient, deformable material; heating the tube; placing the heated tube over the positive model to allow the tube to conform to the shape of the positive model; forming a hard shell over the conformed material; machining the device to allow easy ingress and egress for the equipment and attaching hardware to secure the equipment within the case and the case to the person.

In accordance with yet a further aspect of the present invention, the protective equipment case may be formed with an opening in the case through which a user may access and utilize the equipment without removing the equipment from the case.

BRIEF DESCRIPTION OF THE DRAWING FIGURES

A preferred exemplary embodiment of the present invention will hereinafter be described in conjunction with the appended drawing figures, in which like numerals denote like elements, and:

DETAILED DESCRIPTION OF PREFERRED EXEMPLARY EMBODIMENTS

Figure 1:
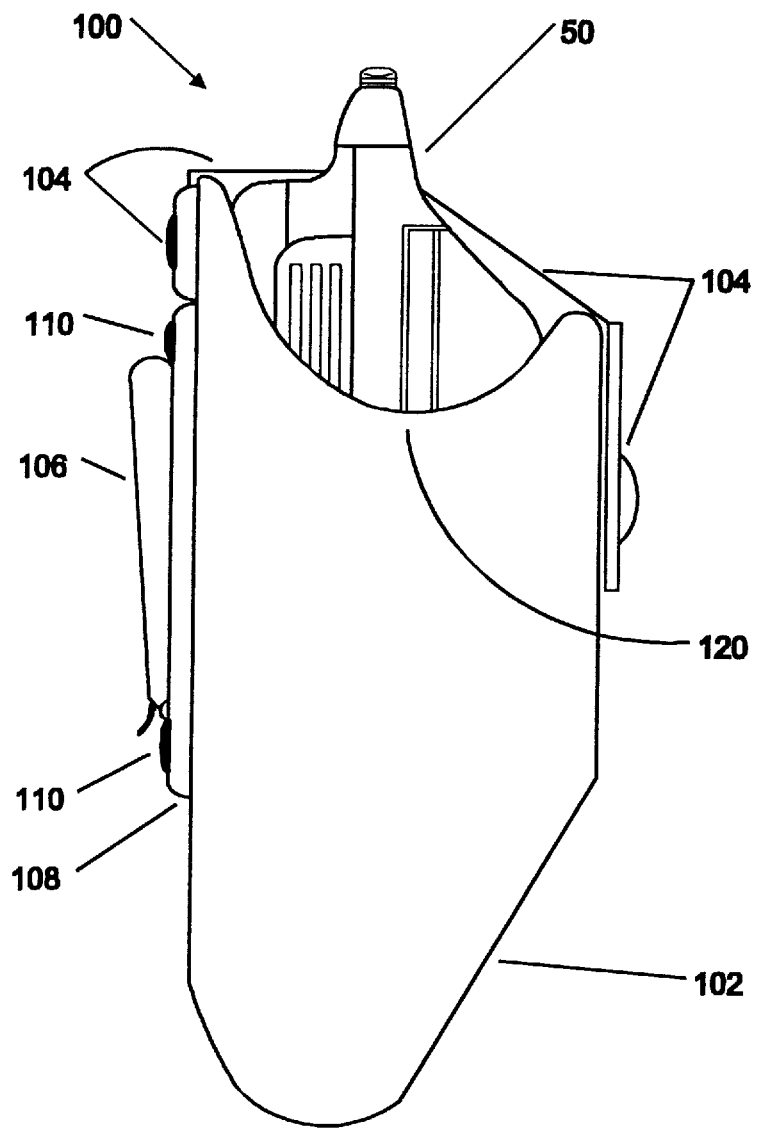
FIG. 1 is a side view of an exemplary cellular phone protective case in accordance with the present invention.

Referring now to FIG. 1, a preferred exemplary protective carrying case 100 suitably comprises a housing 102, which houses and provides protection to equipment housed therein, such as a cellular phone 50; a securing mechanism 104 for securing cellular phone 50 within housing 102; and an attachment mechanism 106, which permits the user to attach protective case 100 (and hence cellular phone 50) to the user, such as to the user's belt or pants waistband.

Referring now to FIGS. 1 through 5, securing mechanism 104 retains cellular phone 50 within housing 102 while phone 50 is stored in housing 102. Securing mechanism 104 suitably comprises any mechanism for retaining cellular phone 50 within housing 102, including a lid, cover, or strap. In a preferred embodiment, securing mechanism 104 suitably comprises a strap 202 for securing cellular phone 50 within housing 102; a detachable interface 201 for detachably securing strap 202 to housing 102 and allowing ingress and egress to housing 102; and a fixed interface 501 for fixedly securing strap 202 to housing 102.

Figure 2:
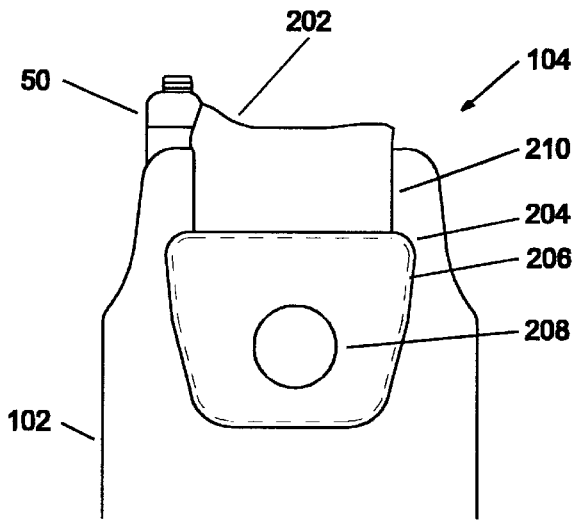
FIG. 2 is a partial front view of an exemplary mechanism for securing a cellular phone within the protective case in accordance with the present invention.
Figure 4:
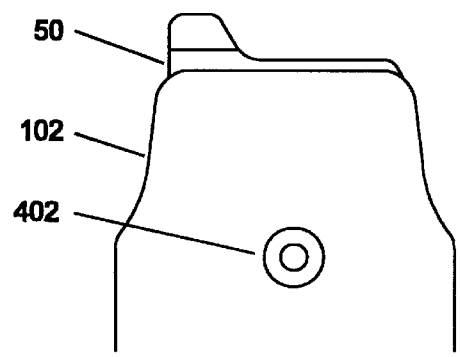
FIG. 4 is a partial front view of the protective case with the securing means of FIG. 2 detached.
Figure 3A:
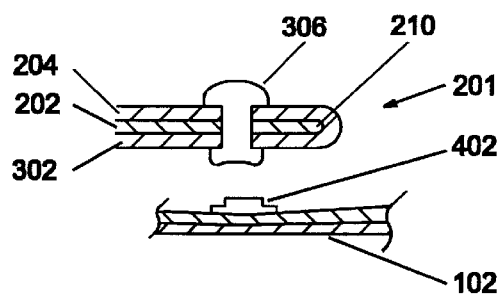
FIG. 3A is a cut away view of the securing means of FIG. 2.
Figure 3:
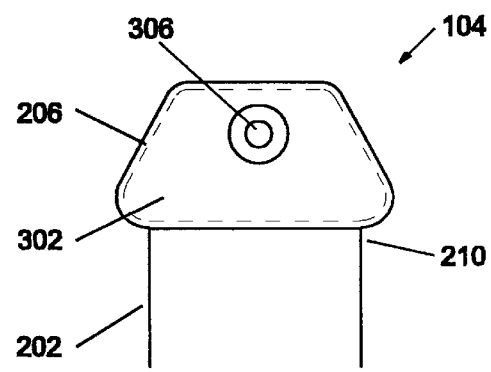
FIG. 3 is a rear view of the securing mechanism of FIG. 2.

Referring particularly to FIGS. 2 through 4, strap 202 may be formed of any material suitable for securing cellular phone within housing 102. In a particularly preferred embodiment, strap 202 comprises an elastic strap to securely restrain cellular phone 50 within housing 102. Detachable interface 201 suitably comprises an upper facing 204 and a lower facing 302. Facings 204, 302 are preferably comprised of a resilient, tough material, such as leather. First end 210 of elastic strap 202 is suitably disposed between upper facing 204 and lower facing 302, in a sandwich fashion, and secured in place (FIG. 3A). For example, elastic strap 202 may be secured between facings 204, 302 by sewing facings 204, 302 together through strap 202, thus securing strap 202 within facings 204, 302. Facings 204, 302 may comprise separate leather portions which are suitably sewn together on all sides. Alternatively, facings 204, 302 may comprise a single piece (e.g., leather) which is folded in half and sewn together.

Strap 202 may be selectively removed from cellular phone 50 to allow phone 50 to be withdrawn from housing 102. Any suitable technique or mechanism may be used to facilitate removal of cellular phone 50, such as slipping strap 202 laterally away from phone 50 or removal of strap 202 by detaching first end 210 of strap 202. Strap 202 may be detachably connected to housing 102 using any suitable mechanism, such as Velcro (hook and loop fastener) or a pin and slot combination. Preferably, however, facings 204, 302 of strap 202 detachably communicate with housing 102 via a snap 208. Snap 208 comprises base portion 402 fixedly attached to housing 102 and cap portion 306 fixedly attached to detachable interface 201. Base portion 402 may suitably be fixedly attached by riveting base portion 402 to housing 102. Similarly, cap portion 306 may be fixedly attached the detachable interface 201 by riveting cap portion to detachable interface 201. Referring to FIG. 3A, cap portion 306 suitably extends through upper facing 204, elastic strap 202, and lower facing 302 for detachable communication with base portion 402.

Figure 5:
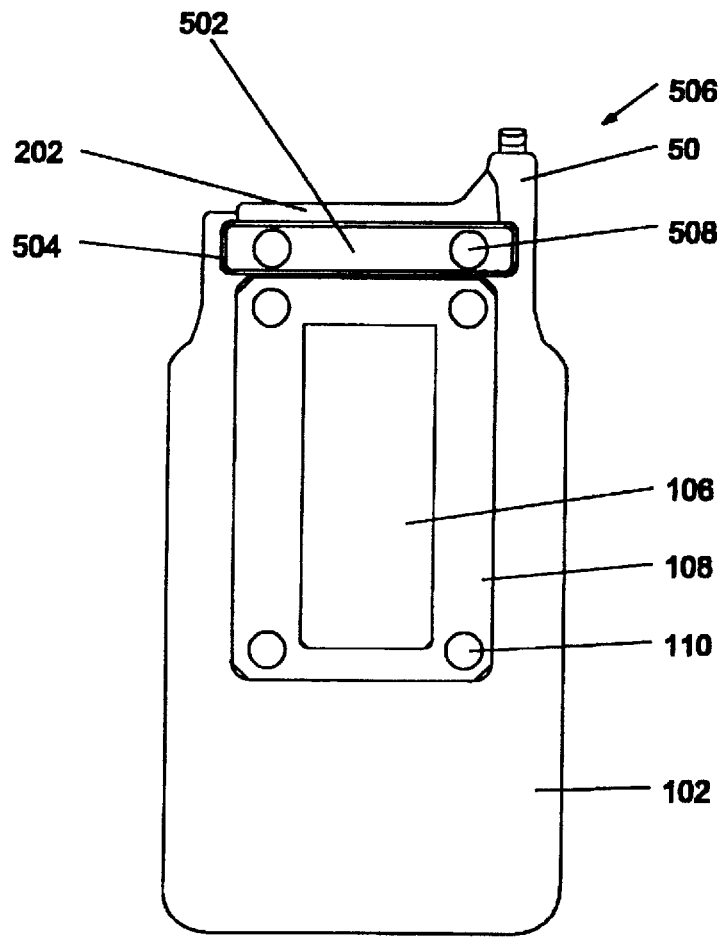
FIG. 5 is a rear view of the protective case of FIG. 1.
Figure 5A:
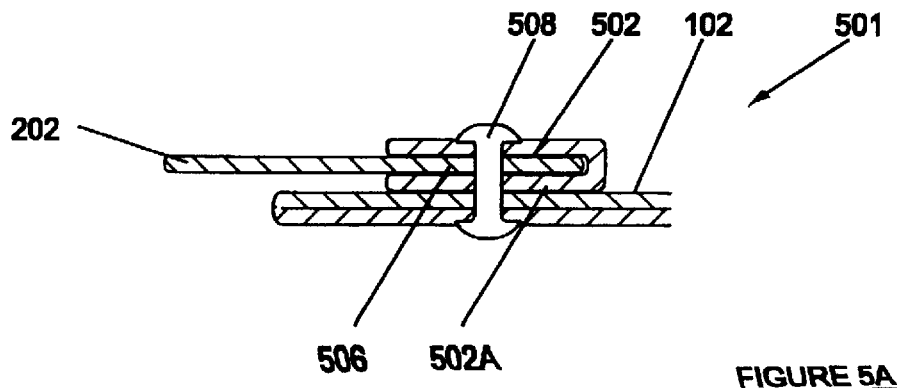
FIG. 5A is a cut away view of the fixed attachment of the securing mechanism of FIG. 2.

Referring now to FIGS. 5 and 5A, second end 506 of elastic strap 202 is affixed to housing 102 through fixed interface 501. Fixed interface 501 suitably comprises an upper facing 502 and a lower facing 502A, each suitably comprised of leather. Second end 506 is suitably disposed between upper facing 502 and lower facing 502A, in a sandwich fashion, and secured in place, for example, by sewing facings 502, 502A together. As discussed above in connection with facings 204, 302, facings 502, 502A may comprise separate leather portions which are suitably sewn together on all sides. Alternatively, facings 502, 502A may comprise a single leather piece which is folded in half and sewn together.

Fixed interface 501 is suitably affixed to housing 102. Any suitable mechanism may be used to attach fixed interface 501 to housing 102. For example, fixed interface 501 may be fixedly attached to housing 102 via post and cap rivets 508. Referring to FIG. 5A, in a preferred embodiment of the present invention, a plurality of post and cap rivets 508, preferably two, extend through facing 502, elastic strap 202, and facing 502A, securing fixed interface 501 to housing 102.

When not in use, the user may place cellular phone 50 in housing 102. The phone may then be secured by connecting cap portion 306 of snap 208 to base portion 402. When the user desires to use cellular phone 50, the user detaches cap portion 306 and base portion 402, allowing removal of phone 50 from housing 102.

Figure 6:
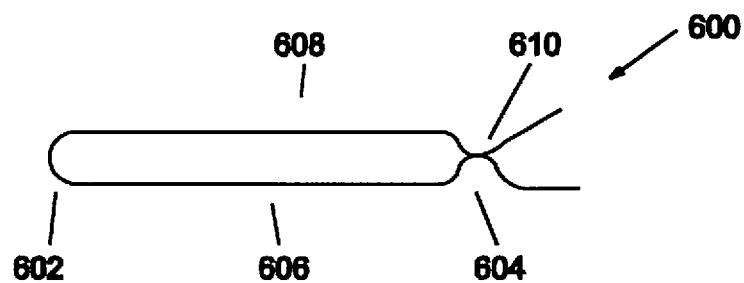
FIG. 6 is a side view of an exemplary clip in accordance with the present invention.
Figure 7:
FIG. 7 is a top view of the interface for securing the clip of FIG. 6 to the protective case in accordance with various aspects of the present invention.
Figure 8:
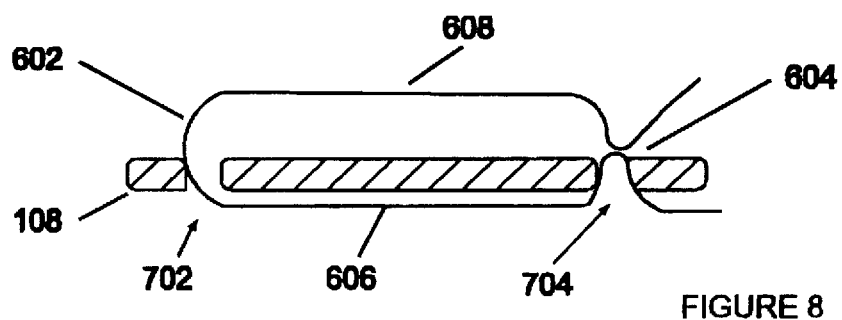
FIG. 8 is a cut away side view of the interface of FIG. 7 with the clip of spring 6 disposed thereon.

Referring now to FIG. 1 and FIGS. 5–8, attachment mechanism 106 facilitates attachment of housing 102 to a user, such as a user's belt or pants waistband. Attachment mechanism 106 suitably comprises any mechanism for securing housing 102 to a person or clothing, such as a shoulder strap or belt loop. Preferably, attachment mechanism 106 comprises a clip 600 for attaching protective case 100 to the user's belt or pants waistband. Clip 600 is suitably comprised of a strong material resistant to permanent deformation, such as a high quality tempered spring steel. Referring to FIG. 6, clip 600 includes curve portion 602, lip 604, stationery section 606, spring section 608, and locking section 610. Clip 106 is attached to housing 102 suitably with an interface 108. Referring to FIG. 7, interface 108, in a preferred embodiment of the present invention, comprises a rectangular material, such as leather, having a first aperture 702 and second aperture 704. Curve portion 602 of clip 106 is received through first aperture 702 and lip 604 protrudes through second aperture 704. Stationery section 606 underlies interface 108 and spring section 608 overlies interface 108 with locking section 610 having contact with lip 604. Interface 108 with clip 600 disposed thereon is attached to or integrally formed in housing 102. In a preferred embodiment, interface 108 is attached to housing 102 with a plurality post and cap rivets 110. Referring to FIG. 5, post and cap rivets 110 suitably extend through interface 108 and housing 102 placing interface 108 and housing 102 in secure, fixed communication with each other.

Clip 600 provides a locking action, securing housing 102 and cellular phone 50 to the user by, for example, sliding clip 600 over the user's belt or pants waistband. When attached over the belt of a user (not shown), the belt is disposed between spring section 608 and interface 108. Lip 604 and locking portion 610 prevent dislodgement of protective case 100. While the case may be removed from the user's belt by resiliently deflecting spring section 608, a strong spring force of spring section 608 prevents inadvertent dislodgement of case 100 regardless of whether the user is standing upright, bending over, or reclining.

Figure 9:
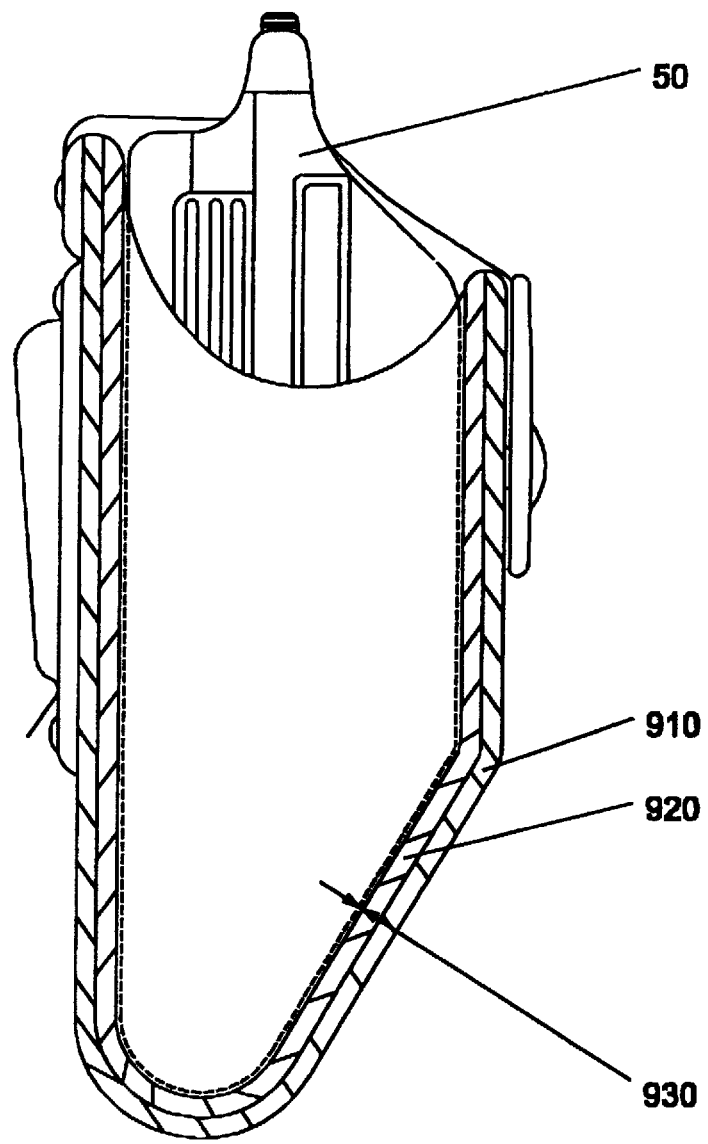
FIG. 9 is a partial cut away side view of a protective case in accordance with the present invention.

Referring now to FIG. 9, housing 102 suitably houses cellular phone 50. U-shaped depressions 120 (FIG. 1) may be formed in housing 102 to allow a user to grasp phone 50 and remove phone 50 with ease from case 100. Housing 102 comprises a hard outer shell 910 and a deformable, resilient inner shell 920. Outer shell 910 protects phone 50 from direct impact for example in the event case 100 is dropped. Outer shell 910 protects phone 50 by absorbing the impact without causing appreciable deformation to the shell. Outer shell 910, in a preferred embodiment, is suitably formed of polypropylene plastic. Outer shell 910 could be formed of any suitable material, such as co-polymer plastic or ABS (Acrylonitrile Butadiene Styrene) plastic, that is capable of withstanding impact without shattering or plastically deforming.

In the event case 100 is dropped, inner shell 920 further protects phone 50 from impact related damage. Inner shell 920 is formed of a resilient, deformable material, such as a foam, which provides a cushion between phone 50 and outer shell 910. In a preferred embodiment of the present invention, inner shell 920 is formed of an ethylene vinyl acetate (EVA) foam. Alternatively, inner shell 920 may be formed of EVA lite, nickel plast, nickel plast lite, pelite or other material having a standard duramitor of 15 to 50 measured on the Shore A scale and preferably a standard duramitor of 30 to 35 measured on the Shore A scale. Outer shell 910 and inner shell 920 are suitably formed to conform generally to the shape of phone 50. A gap 930 may be formed between cellular phone 50 and inner liner 920 to allow phone 50 to be easily placed in and removed from housing 102. Preferably, gap 930 is minimal to prevent undesired movement of phone 50 within housing 102. Accordingly, gap 930 is suitably in the range of 0 to 8 mm, preferably 0.5 mm to 4 mm, and most preferably 1 mm.

Figure 14:
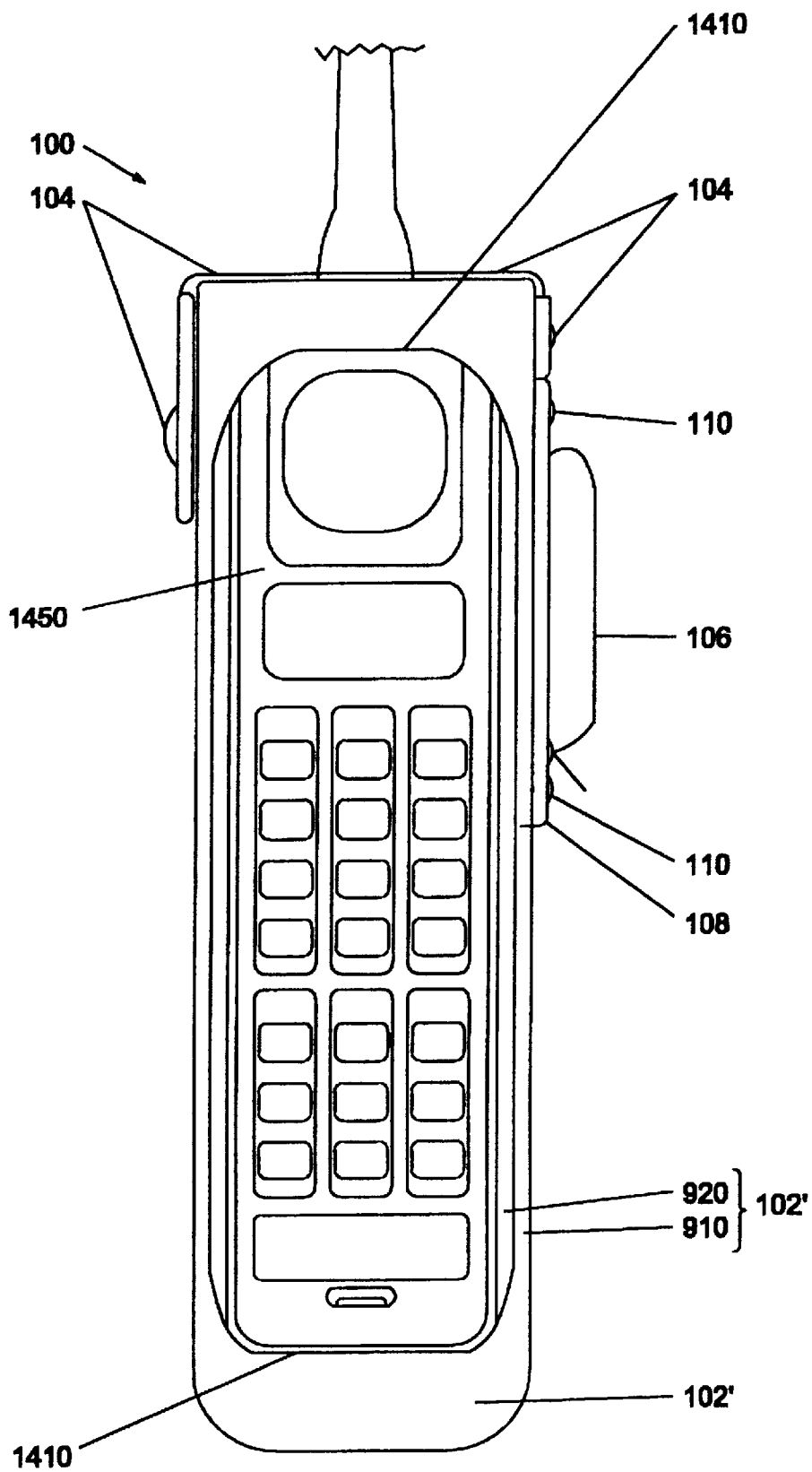
FIG. 14 is a front view of an alternate embodiment of a protective case in accordance with the present invention.

Referring now to FIG. 14, in accordance with an alternate embodiment 100' of the present invention, housing 102' suitably comprises an access opening 1410. Access window 1410 suitably allows a user to access and utilize the equipment, such as phone 1450, housed therein without removing phone 1450 from housing 102'.

Figure 10:
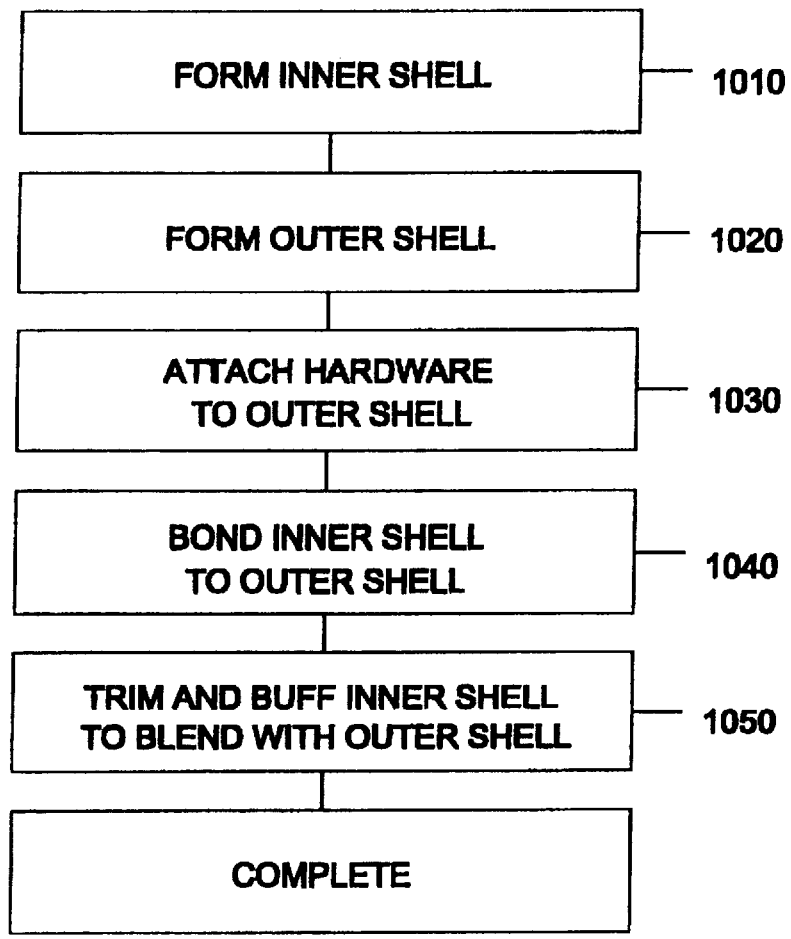
FIG. 10 is a flow chart for a method of making a protective case in accordance with the present invention.

Referring now to FIG. 10, a method 1000 in accordance with the present invention for making a protective case, such as for example, protective case 100, generally comprises forming a resilient, deformable inner shell (step 1010); forming a hard, impact-resistant outer shell (step 1020); attaching hardware to the outer shell (step 1030); bonding the inner shell to the outer shell (step 1040); and trimming and buffing the inner shell (step 1050).

Figure 11:
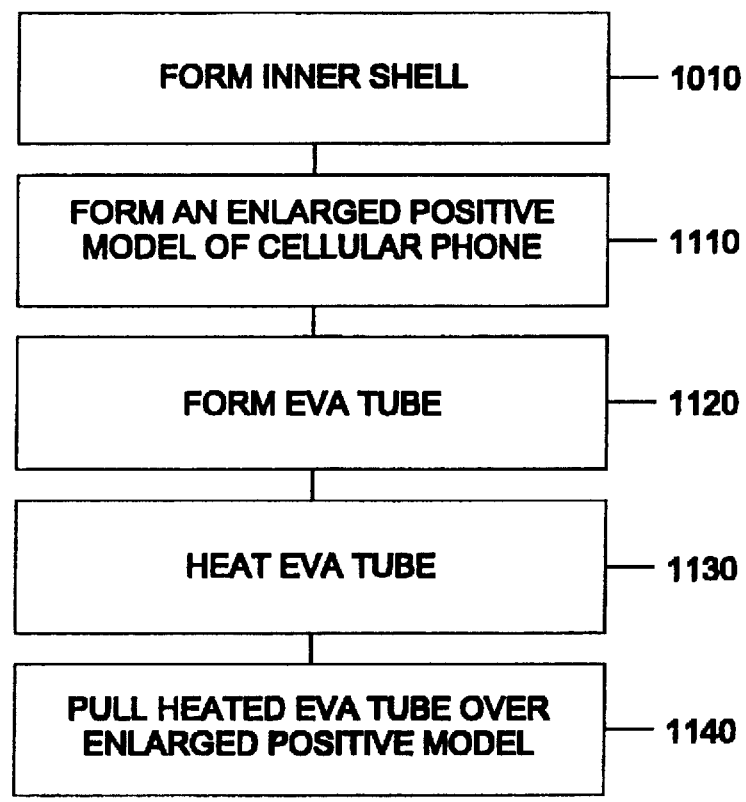
FIG. 11 is a flow diagram of a method of forming the inner shell of the present invention.
Figure 12:
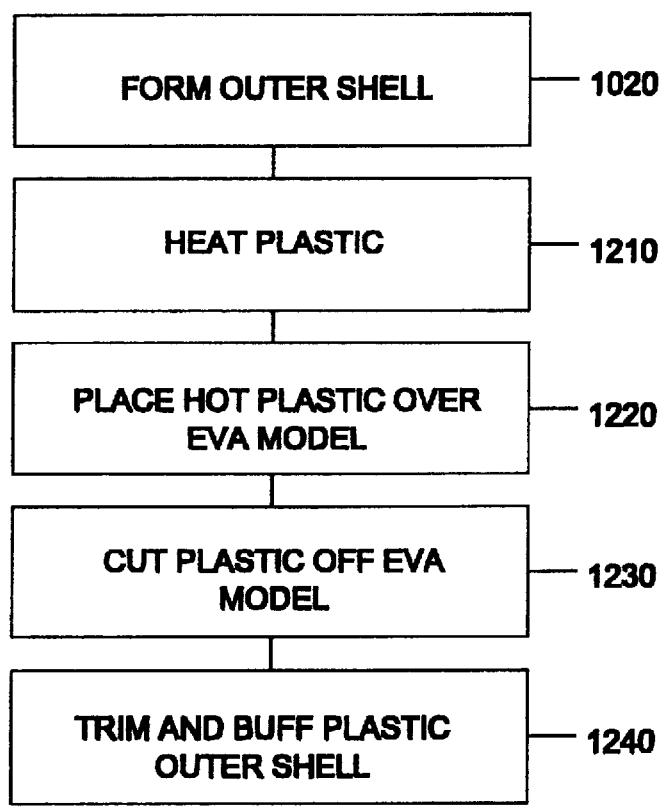
FIG. 12 is a flow diagram for forming the outer shell of the protective casing in accordance with the present invention.

More particularly, referring to FIG. 11, forming resilient, deformable inner shell (step 1010) comprises the steps of forming an enlarged positive model (step 1110) of cellular phone 50, forming an EVA tube (step 1120), heating the EVA tube (step 1130), and pulling the heated EVA tube over the enlarged positive model (step 1140), allowing the tube to form to the shape of the model upon cooling.

Forming an enlarged positive model (step 1110) includes selecting a positive model, e.g. a working device or simulated mock up, of cellular phone 50 or other suitable device. As protective case 100 is formed to the shape of cellular phone 50, cellular phone 50 suitably may comprise any cellular phone. The external dimensions of the positive model are expanded from the actual physical size of the device by 0 to 8 mm, preferably 0.5 to 4 mm, and most preferably 1 mm in thickness in all directions, corresponding to gap 930. The positive model may be expanded, for example, by wrapping the positive model in tape.

Because the actual cellular phone or a simulated mock-up of a cellular phone may not be suitable to exposure to heat, a plaster model of the phone may be created. A negative impression of the expanded positive model is created by pouring a duplicating material, such as alginate, into a mold form. The expanded positive model is inserted into the alginate. After approximately 3 to 5 minutes, the expanded positive model is removed from the alginate, leaving a negative impression of the expanded positive model. An enlarged positive model is formed from the negative impression, for example, by pouring a plaster, such as die stone, into the negative impression of the expanded positive model. The plaster is preferably a hard plaster which dries with minimal shrinkage and distortion. To aid in handling the plaster model and making protective case 100, a handle, such as a piece of rebar, may be inserted in the die stone. After the die stone hardens, it is removed from the negative mold to yield the enlarged positive model. Any flaws or undercuts are removed from the enlarged positive model, and the model is fitted with a liner, such as a vacuum interface nylon liner. The vacuum interface nylon liner allows formation of the resilient, deformable inner shell about the positive model without the inner shell adversely adhering to the positive model.

Figure 13A:
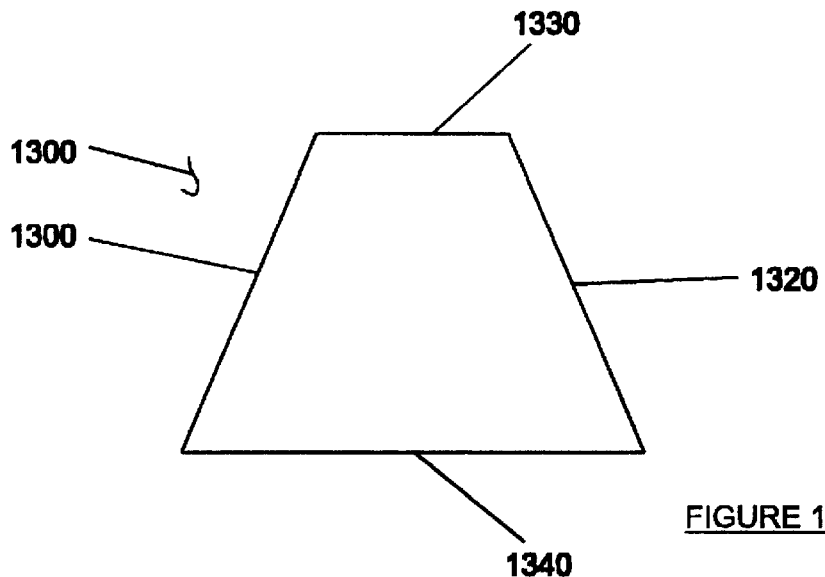
FIG. 13A is a top view of an exemplary pattern cut from EVA for forming the inner shell in accordance with the present invention.
Figure 13B:
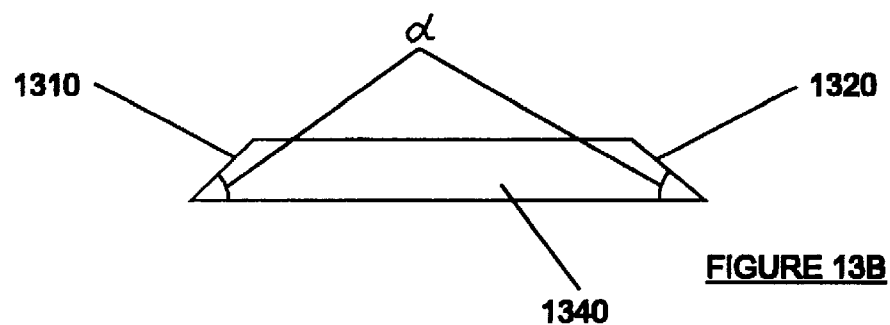
FIG. 13B is a side view of the pattern of FIG. 13A.
Figure 13C:
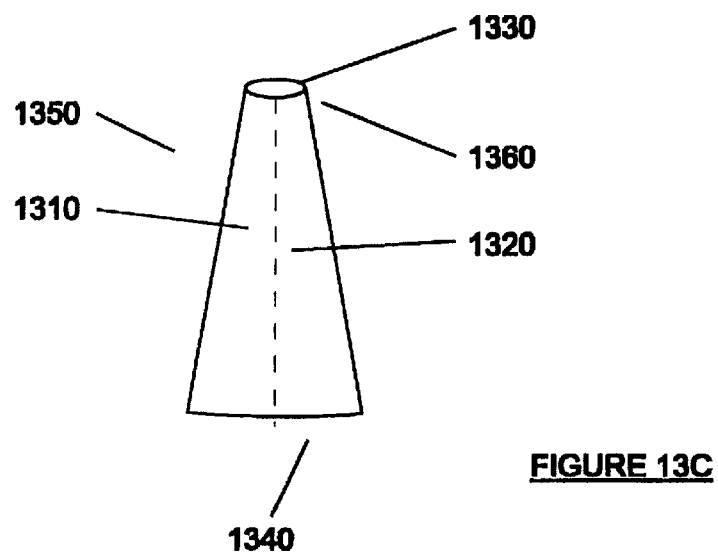
FIG. 13C is a side view of the EVA tube used in forming the inner shell in accordance with the present invention.

Referring to FIGS. 13A–13C, forming an EVA tube (step 1120) may comprise the steps of cutting a pattern 1300 out of a sheet of resilient, deformable material, such as EVA. Pattern 1300 may vary for different cellular phones and devices. For example, referring to FIG. 13A, a desirable pattern for the Motorola micro T-A-C ultra lite cellular phone comprises a quadrilateral shape having sides 1310 and 1320 of approximately 12 inches, side 1330 of approximately 4 inches, and side 1340 of approximately 9½ inches. Sides 1310 and 1320 are brought together, for example, by rolling pattern 1300, and secured to each other, for example, by gluing the edges to each other, forming an EVA tube 1350. Referring particularly to FIG. 13B, to facilitate secured communication, edges on sides 1310, 1320 may be suitably skived or cut at an angle $\alpha$ of approximately 45°. Skiving the edges allows sides 1310 and 1320 to be brought together without forming gaps in EVA tube 1350, thereby improving the secured communication of sides 1310 and 1320.

The EVA tube, such as EVA tube 1350, may be heated (step 1130), for example in a convection oven, to bring the EVA to its thermal forming temperature. Desirably, EVA tube 1350 is heated to 250° to 325° F., and more preferably 275° to 300° F. The heated EVA tube 1350 may then be pulled over the enlarged positive model (step 1140). As EVA tube 1350 cools, the EVA forms to the shape of the enlarged positive model. After cooling, distal end 1360 is split, conformed over itself, and glued in place to form an EVA inner shell.

After forming the EVA inner shell (step 1010), a second vacuum interface nylon is placed over the EVA inner shell, while the inner shell is disposed on the enlarged positive model. The enlarged positive model, with the EVA inner shell formed thereon, is suitably placed in a vacuum pipe table and sealed off at the top of the vacuum pipe table with, for example, vinyl tape.

An outer shell, such as outer shell 910, is formed (step 1020) around the EVA shell. Outer shell 910 may be formed in any suitable manner, such as injection molding or thermal forming. Injection molding is known and commonly used to form plastics, such as polypropylene, to a desired shape. Suitably, outer shell 910 may be formed using conventional injection molding techniques. Use of injection molding to form outer shell 910 provides several advantages, such as allowing for a textured external surface to help resist scratches and reduced manufacturing time and cost. When injection molding techniques are used to form outer shell 910, the resultant plastic shell desirably has a thickness of 1/16 inch to ¼ inch, more preferably 3/32 inch to ⅛ inch, and most preferably ⅛ inch. The resultant plastic shell suitably forms outer shell 910 and includes unshaped depressions 120 and apertures to facilitate attachment of hardware items (step 1030), such as spring steel clip 600 and elastic strap 202, to outer shell 910, for example by use of rivets 110, 508 and base portion 402 of snap 203.

Alternatively, to thermal form outer shell 910, a sheet of plastic, such as polypropylene plastic, approximately 3/16 inch in thickness, is desirably heated to its thermal forming temperature, typically 300° to 375° F., preferably 325° to 350° F., and most preferably to 325° F. When the sheet of polypropylene plastic has reached peak thermal forming temperature, the heated plastic is placed over the nylon interface covered EVA inner shell and seamed along the back, bottom and top. The vacuum pipe is then activated causing the plastic to conform to the shape of the positive model. The interface nylon suitably prevents air from being trapped in the plastic and helps in creating an intimate positive shell around the EVA inner shell and enlarged positive model. The resultant plastic shell desirably has a thickness of 1/16 inch to 1/4 inch, more preferably 3/32 inch to 1/8 inch, and most preferably 1/8 inch, and is formed, generally, to the shape of cellular phone 50.

After cooling, the plastic shell is cut off the EVA model (inner shell and the enlarged positive model) and is buffed to remove rough edges. In addition, the plastic shell is ground down to proper trim lines. For example, referring briefly to FIG. 1, u-shaped depressions 120 may be formed in the plastic shell completing formation of outer shell 910. Hardware items, such as, spring steel clip 600 and elastic strap 202, are securely attached (step 1030) to plastic shell 910, for example by use of rivets 110, 508, and base portion 402 of snap 203.

The inner EVA shell is removed from the enlarged positive model and bonded to plastic outer shell 910 (step 1040). The inner EVA shell may be bonded to outer shell 910 using any suitable means which securely attaches inner shell 920 to outer shell 910. In a preferred embodiment of the present invention, the inner shell is bonded to outer shell 910 by applying a polyadhesive glue to the inner shell or to the internal portion of shell 910 and inserting the inner shell into outer shell 910. The inner EVA shell is then cut (step 1050) to match the trim lines of outer shell 910 and buffed to blend with outer shell 910, forming a completed, inner shell such as inner shell 920. As discussed above, inner shell 920 suitably provides cushioning for cellular phone 50. In addition, inner shell 920 covers hardware attachments (e.g., rivets 110, 508, and base portion 402 of snap 203), providing further protection to cellular phone 50.

In accordance with an alternate embodiment of the present invention, an access window, such as access window 1410, may be formed in protective case 100. Access window 1410 may be suitably formed by cutting through the plastic shell and EVA inner shell while each are still on the enlarged positive model. Forming access window 1410 in protective case 100 when the plastic shell is still placed over the EVA inner shell and enlarged positive model further facilitates removal of the plastic shell from the EVA inner shell and enlarged positive model.

Alternatively, access window 1410 may be formed in protective case 100 by cutting an aperture in the plastic shell after the plastic shell has cooled and been removed from the EVA inner shell and enlarged positive model. After the EVA shell is removed from the enlarged positive model and bonded to plastic outer shell 910, an aperture in the EVA shell may suitably be formed to correlate with that formed in the plastic outer shell 910. Suitably, the EVA shell is then buffed to blend with the aperture of outer shell 910.

Thus, by providing a case having an impact-resistant outer shell, a resilient, deformable inner shell, and mechanisms for securing the piece of electronic equipment within the case and the case to the user, the protective case of the present invention suitably overcomes shortcomings of known devices.

The foregoing description of a preferred exemplary embodiment and best mode of the invention known to the applicant at the time of filing the application has been presented for the purposes of illustration and description. It is not intended to be exhaustive or to limit the invention to the precise form disclosed; many modifications and variations are possible within the scope of the invention as set forth in the present description. For example, while the method and apparatus of the present invention are described in the context of the cellular phone, the methods may be utilized to construct protective cases for hand held radios, portable CD players, calculators, or an entire range of electronic equipment. The various embodiments described herein were chosen to conveniently explain the principles of the invention and its practical application, to thereby enable others of ordinary skill in the art to best utilize the invention in various embodiments and with various modifications as are suited to the particular use contemplated. It is intended that the spirit and scope of the invention be defined by the appended claims.

It is claimed:

1. A protective case for carrying a handheld portable cellular phone, said phone having a main body portion and a top antenna portion, said case being conformed substantially to said body portion of said phone and comprising:

a housing defined by a base, a front panel, a rear panel, two side panels and an open top portion that surround and enclose said main body portion and expose said top antenna portion of said phone, said side panels being formed with recesses extending downwardly from said open top portion to permit a user to easily grasp and remove said phone from said case, and said housing having an outer shell formed of a rigid, impact-resistant material to protect said phone from direct impact and an inner shell formed of a resilient, deformable material to cushion said phone;

an elastic strap extending across said open top portion of said housing for securing said phone within said housing, a fixed end of said strap being fixedly secured at a fixed interface to said rear panel, and a detachable end of said strap being detachably secured at a detachable interface to said front panel; and attachment means for securing said housing to a person.

2. A case as claimed in claim 1, wherein said fixed interface comprises first upper and lower facings surrounding and securing said fixed end of said strap, and a fastener which fastens said first upper and lower facings and said fixed end of said strap to said rear panel of said housing.

3. A case as claimed in claim 2, wherein said detachable interface comprises second upper and lower facings surrounding and securing said detachable end of said strap, and a snap which comprises a base portion fixedly attached to said front panel of said housing and a cap portion fixedly attached to said second upper and lower facings.

4. A case as claimed in claim 3, wherein said first and second upper and lower facings are comprised of leather and are sewn together.

5. A case as claimed in claim 2, wherein said fastener comprises at least one post and cap rivet.

6. A case as claimed in claim 1, wherein said attachment means comprises a clip formed of a strong material which is resistant to permanent deformation.

7. A case as claimed in claim 6, wherein said attachment means further comprises an interface having first and second apertures which is fixedly attached to said rear panel of said housing, and said clip comprises a stationery section disposed between said interface and said rear panel; a lip extending from one end of said stationery section and protruding through said second aperture; a curve portion extending from an opposite end of said stationery section through said first aperture; a spring section extending from said curve portion and overlying said interface; and a locking section formed at an end of said spring section opposite said curve portion which engages said lip.

8. A case as claimed in claim 7, wherein said clip is formed of tempered spring steel, and said interface is formed of leather.

9. A case as claimed in claim 1, wherein said outer shell is formed of polypropylene plastic.

10. A case as claimed in claim 9, wherein said inner shell is formed of ethylene vinyl acetate foam.

11. A case as claimed in claim 10, wherein a layer of polyadhesive glue is disposed between said inner shell and said outer shell.

12. A case as claimed in claim 1, wherein a gap is formed between said inner shell and said phone to permit easy placement of said phone in, and removal of said phone from, said housing.

13. A case as claimed in claim 12, wherein said gap has a width of 0.5 to 4.0 millimeters.

* * * * *